(12) United States Patent
Kim

(10) Patent No.: US 6,651,598 B2
(45) Date of Patent: Nov. 25, 2003

(54) COOLING SYSTEM FOR VEHICLES

(75) Inventor: Yong-Woo Kim, Seoul (KR)

(73) Assignees: Hyundai Motor Company; Kia Motors Corporation, Seoul (KR)

( * ) Notice: Subject to any disclaimer, the term of this patent is extended or adjusted under 35 U.S.C. 154(b) by 0 days.

(21) Appl. No.: 10/028,139

(22) Filed: Dec. 20, 2001

(65) Prior Publication Data

US 2002/0083905 A1 Jul. 4, 2002

(30) Foreign Application Priority Data

Dec. 30, 2000 (KR) .......................................... 2000-86807

(51) Int. Cl.[7] .................................................. F01P 9/00
(52) U.S. Cl. ................................................... 123/41.47
(58) Field of Search .......................... 123/41.01, 41.47, 123/41.44, 41.46, 41.02, 41.1, 41.31, 41.54, 198 C, 41.45; 165/42, 107, 51

(56) References Cited

U.S. PATENT DOCUMENTS 4,061,187 A * 12/1977 Rajasekaran et al. .. 165/104.31
4,212,270 A * 7/1980 Nakanishi et al. ........ 123/41.09
5,540,192 A * 7/1996 Xanders .................... 123/41.44

FOREIGN PATENT DOCUMENTS

JP 62153596 A * 7/1987 ............ F04D/15/00

* cited by examiner

Primary Examiner—Henry C. Yuen
Assistant Examiner—Hyder Ali
(74) Attorney, Agent, or Firm—Pennie & Edmonds LLP

(57) ABSTRACT

A cooling system for a vehicle comprises: a radiator and a water pump. The water pump comprises: a housing that forms a main body of the water pump and is mounted on an engine cylinder block that is provided with a plurality of coolant passageways; a pulley that is transfers turning force from an engine crankshaft to the water pump; a first impeller that forces coolant to circulate through an engine; a pump shaft that is rotatably mounted to the housing, one end of which is fixedly connected to the pulley, the other end of which is fixedly connected to the first impeller; a second impeller that forces coolant to circulate through the engine and the radiator; and a second impeller rotating means that selectively rotates the second impeller according to a coolant temperature.

11 Claims, 2 Drawing Sheets

COOLING SYSTEM FOR VEHICLES

BACKGROUND OF THE INVENTION

The present invention relates to a cooling system for vehicles, and more particularly, to a system in which a water pump additionally performs functions of a thermostat so that a structure of the cooling system can be simplified.

Generally, as shown in FIG. 1, a conventional cooling system comprises a water pump 1 that forces coolant through an engine and other system parts, a thermostat 2 that controls coolant flow and engine operating temperature, a radiator 3 that transfers engine coolant heat to outside air, and radiator hoses 4 that connect an engine 5 to the radiator.

The water pump 1 comprises an impeller that forces coolant through the engine block, cylinder head, and radiator. A water pump pulley is connected to an engine crankshaft pulley via a fan belt so that the spinning engine crankshaft pulley causes the fan belt to turn the water pump pulley, pump shaft, and the impeller. The water pump 1 spins and produces coolant pressure and flow using the impeller.

To minimize an amount of exhaust gas during cold starting and to improve engine durability, when the engine is cold the thermostat 2 is closed and coolant cannot circulate through the radiator 3. Instead, the coolant circulates around inside the engine block, cylinder head, and intake manifold until the engine is warm. As the coolant becomes hot, the thermostat gradually opens and allows coolant to flow through the radiator so that the coolant temperature is maintained to a certain level.

However, when the engine is at low rpm, friction force between the impeller and the coolant becomes relatively larger, and therefore engine load increases so that fuel economy becomes poor.

Further, in the conventional cooling system, the thermostat and the water pump exist separately so that the cooling system becomes complicated, and also engine power is diminished because of driving the water pump while the thermostat is closed.

SUMMARY OF THE INVENTION

The present invention provides a cooling system in which unnecessary power loss can be decreased. According to a preferred embodiment, the cooling system of the present invention comprises a radiator that transfers coolant heat to outside air, a water pump that is mounted to an engine and forces coolant through an engine and other system parts. Preferably the water pump comprises a housing that forms a main body of the water pump and is mounted on an engine cylinder block that is provided with a plurality of coolant passageways, a pulley that transfers turning force from the engine crankshaft to the water pump, a first impeller that forces coolant to circulate through the engine, a pump shaft that is rotatably mounted to the housing, one end of which is fixedly connected to the pulley, the other end of which is fixedly connected to the first impeller, a second impeller that forces coolant to circulate through the engine and the radiator, and a second impeller rotating means that selectively rotates the second impeller according to a coolant temperature.

In an alternative embodiment, a water pump according to the invention comprises a housing, first and second impellers and a temperature responsive linkage between the impellers. The housing supports a pump shaft and other conventional components of a water pump. The first impeller is mounted on the pump shaft to circulate coolant through associated engine coolant passageways as is known in the art. The second impeller supported by the housing to circulate coolant through associated radiator coolant passageways. The temperature responsive linkage is disposed between the second impeller and pump shaft carrying the first impeller to engage the second impeller when coolant temperature rises above a predetermined value.

In a preferred embodiment, the temperature responsive linkage comprises first and second friction plates acted on by biasing members and a heat expansive member. The first friction plate is mounted to the pump shaft. The second friction plate is mounted adjacent to the first friction plate, to rotate with the second impeller. At least one biasing member is disposed to force apart the first and second friction plates in a default condition. The heat expansive member acts in opposition to the at least one biasing member when the coolant temperature rises above a predetermined value. At this point the heat expansive member exerts a force overcoming the biasing member such that the first and second friction members are forced together for rotation of the second impeller. Preferably the biasing members are springs and the heat expansive member is a member filled with a fluid that expands when heated, such as wax.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Hereinafter, a preferred embodiment of the present invention will be described in detail with reference to the accompanying drawings.

Figure 1:
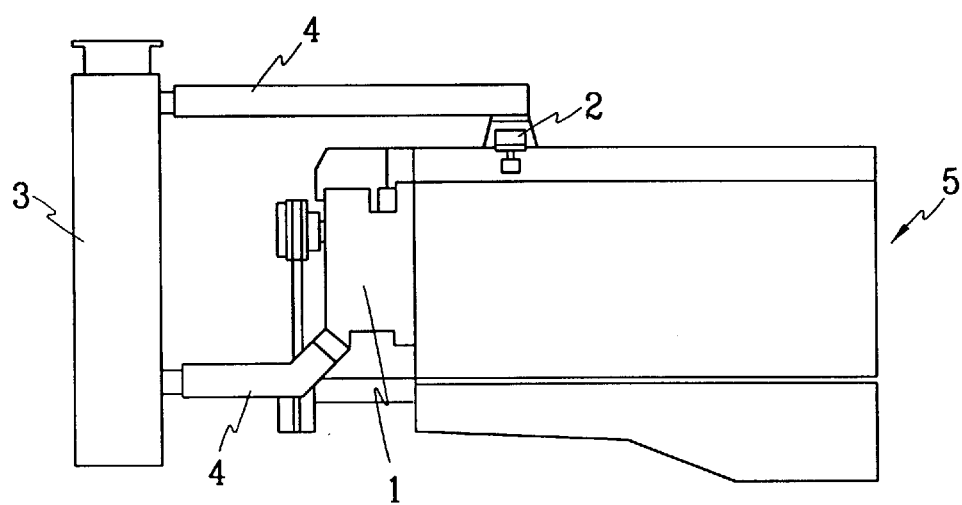
FIG. 1 is a schematic block diagram of a conventional cooling system.
Figure 2:
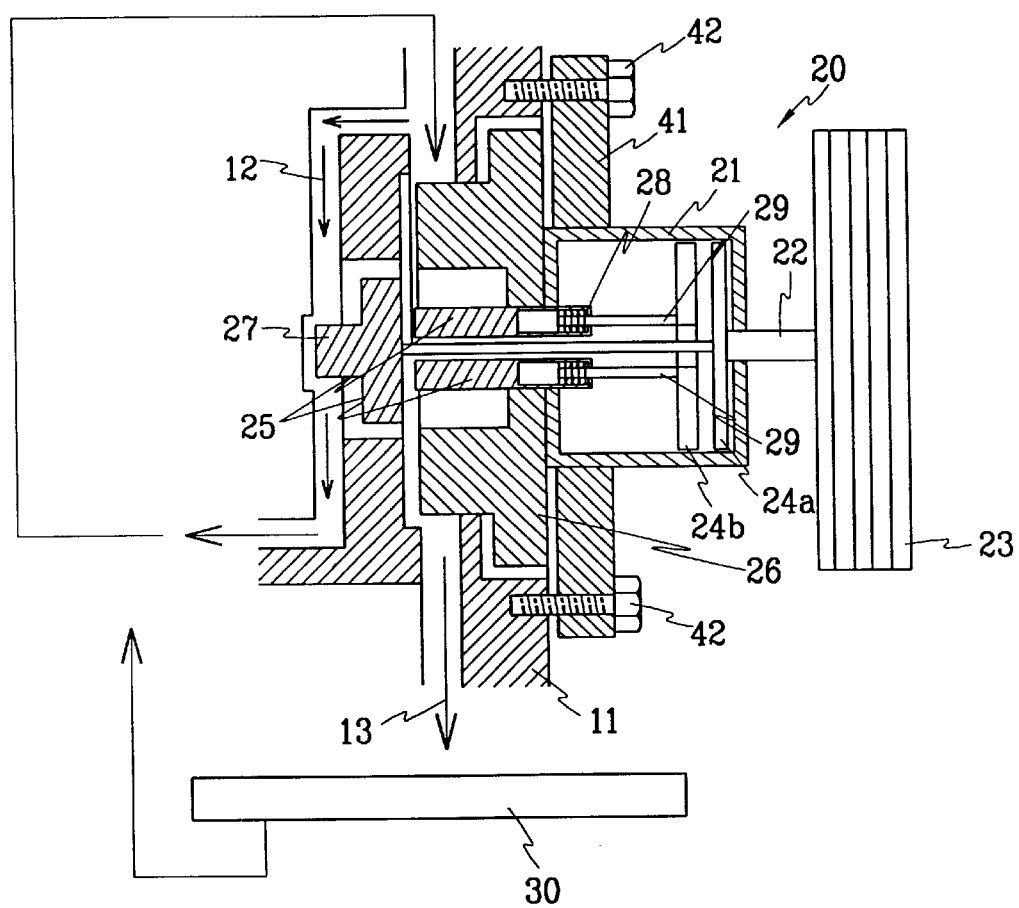
FIG. 2 is a schematic block diagram of a cooling system according to the preferred embodiment of the present invention.

As shown in FIG. 2, the cooling system according to the preferred embodiment of the present invention comprises a water pump 20 that is mounted to a cylinder block 11 of the engine, and a radiator 30 that transfers engine coolant heat to outside air.

The water pump 20 preferably comprises a housing 21, a pump shaft 22, a pulley 23, first and second impellers 27, 26 and a second impeller rotating means. The housing 21 forms a main body of the pump and is mounted on the engine cylinder block 11. The block 11 is provided with a first coolant passageway 12 through which the coolant circulates through the engine and a second coolant passageway 13 through which the coolant circulates through the radiator 30 and the engine. The pump shaft 22 is rotatably mounted to the housing and provided with a first friction plate 24a. The pulley 23 is fixedly connected to one end of the pump shaft 22 and transfers turning force from the engine crankshaft to the pump. The first impeller 27 is fixedly connected to the other end of the pump shaft 22. The second impeller 26 is disposed beside the first impeller 27. The second impeller rotating means selectively rotates the second impeller 26 according to the coolant temperature as described below.

The second impeller rotating means comprises a plurality of heat expansive members, such as wax-filled pellets 25, that are fixedly connected to the second impeller 26, a plurality of plungers 29 that are slidably disposed in the pellets 25 and are elastically supported by an elastic member 28 respectively, and a second friction plate 24b that is fixedly connected to the plungers 29 and faces the first friction plate 24a. When the heat expansive members 25 are heated by the coolant heat, the members expand and push the plunger outward. Then, the second friction plate 24b is coupled with the first friction plate 24a by friction force so that the second impeller 26 rotates if the first impeller 27 rotates.

The housing 21 is provided with a bracket 41 such that the housing can be mounted to the cylinder block 11 through a fixing member 42.

As shown in FIG. 2, the first impeller 27 is disposed in the first coolant passageway 12. Therefore, if the first impeller 27 rotates, the coolant circulates through the engine. The second impeller 26 is disposed in the second coolant passageway 13, and thus if the second impeller 26 rotates, the coolant circulates through the radiator and the engine.

With this configuration, in an early state of engine operation in which the temperature of the coolant is low, the elastic member 28 pushes the plunger 29 in a leftward (in the drawing) direction. The elastic member therefore holds the second friction plate 24b apart from the first friction plate 24a such that the second impeller 26 does not rotate, even while the pump shaft 22 is rotating. Thus, while the second friction plate 24b is not coupled with the first friction plate 24a, the coolant only circulates through the cylinder block so that the engine is quickly heated.

On the other hand, if the coolant heat is transferred to heat expansive members 25, the members expand and push the plunger 29 in a rightward direction (in the drawing) against the elastic force generated by the elastic member 28. When the second friction plate 24b contacts the first friction plate 24a, the second friction plate 24b rotates together with the first friction plate 24a, and the second impeller 26 rotates. Therefore, the coolant circulates through the radiator 30 and the cylinder block so that the coolant temperature can be prevented from excessively rising. Then, if the coolant temperature falls, the heat expansive members contract and the plunger 29 moves to the leftward direction (in the drawing) so that the second friction plate 24b parts from the first friction plate 24a, stopping the second impeller 26 from rotating.

As mentioned above, in a preferred embodiment heat expansive members 25 may be wax filled pellets wherein the wax expands due to the engine heat. Other suitable heat expansive members may include bimetalic strips, or gas or liquid filled cylinder/pistons. The heat expansive members may be selected such that they begin to expand at a predetermined temperature, which may be determined by a person of ordinary skill in the art based on factors such as the type of engine and optimal operating temperature.

Thus, the water pump according to the preferred embodiment of the present invention additionally performs the function of the thermostat. Because the cooling system according to the present invention doesn't need the thermostat, the cooling system can be simplified, and the manufacturing cost can be decreased. Furthermore, in cold starting, redundant power consumption can be decreased so that fuel mileage increases.

While the present invention has been described in detail with reference to the preferred embodiment, those skilled in the art will appreciate that various modifications and/or substitutions can be made thereto without departing from the sprit and scope of the present invention as set forth in the appended claims.

What is claimed is:

1. A cooling system for a vehicle comprising:
   a radiator that transfers coolant heat to outside air; and
   a water pump that is mounted to an engine and forces coolant through the engine and other system parts,
   wherein the water pump comprises:
      a housing that forms a main body of the water pump and is mounted on an engine cylinder block that is provided with a plurality of coolant passageways;
      a pulley that transfers turning force from an engine crankshaft to the water pump;
      a first impeller that forces coolant to circulate through the engine;
      a pump shaft that is rotatably mounted to the housing, one end of which is fixedly connected to the pulley, the other end of which is fixedly connected to the first impeller;
      a second impeller, linkable with the pump shaft, that forces coolant to circulate through the engine and the radiator; and
      a second impeller rotating means that selectively rotates the second impeller according to a coolant temperature to force coolant to circulate through the engine and the radiator by linking the second impeller to the pump shaft.

2. The cooling system of claim 1 wherein the system further comprises a bracket that is fixedly connected to the housing, the bracket being mounted to the engine cylinder block via a fixing member.

3. The cooling system of claim 1 wherein the coolant passageways comprise:
   a first coolant passageway through which the coolant circulates through the engine; and
   a second coolant passageway through which the coolant circulates through the radiator and the engine;
   wherein the first impeller is disposed in the first coolant passageway, and the second impeller is disposed in the second coolant passageway.

4. A cooling system for a vehicle comprising:
   a radiator that transfers coolant heat to outside air; and
   a water pump that is mounted to an engine and forces coolant through the engine and other system parts,
   wherein the water pump comprises:
      a housing that forms a main body of the water pump and is mounted on an engine cylinder block that is provided with a plurality of coolant passageways;
      a pulley that is transfers turning force from an engine crankshaft to the water pump;
      a first impeller that forces coolant to circulate through the engine;
      a pump shaft that is rotatably mounted to the housing, one end of which is fixedly connected to the pulley, the other end of which is fixedly connected to the first impeller, and wherein the pump shaft is provided with a first friction plate;
      a second impeller that forces coolant to circulate through the engine and the radiator; and
      a second impeller rotating means that selectively rotates the second impeller according to a coolant temperature, comprising:
         a plurality of pellets that are fixedly connected to the second impeller, the pellets being filled with fluid;
         a plurality of plungers that are slidably disposed in the pellets;

an elastic member that elastically supports the plunger against the pellet; and a second friction plate that is fixedly connected to the plungers and faces the first friction plate.

5. The cooling system of claim 4 wherein the plunger is arranged such that the fluid pushes the plunger outward if the fluid expands by being heated by coolant heat.

6. The cooling system of claim 4 wherein the fluid is wax.

7. A water pump for a vehicle cooling system, comprising:

a housing supporting a pump shaft;

a first impeller mounted on the pump shaft to circulate coolant through associated engine coolant passageways;

a second impeller, linkable with the pump shaft and supported by the housing, to circulate coolant through associated radiator and engine coolant passageways; and a temperature responsive linkage between the second impeller and the pump shaft that engages the second impeller when coolant temperature rises above a predetermined value to force coolant through associated radiator and engine coolant passageways.

8. A water pump for a vehicle cooling system, comprising:

a housing supporting a pump shaft;

a first impeller mounted on the pump shaft to circulate coolant through associated engine coolant passageways;

a second impeller supported by the housing to circulate coolant through associated radiator and engine coolant passageways; and a temperature responsive linkage between the second impeller and pump shaft to engage the second impeller when coolant temperature rises above a predetermined value;

wherein the temperature responsive linkage comprises:

a first friction plate mounted to the pump shaft;

a second friction plate mounted adjacent to said first plate for rotation of the second impeller;

at least one biasing member forcing apart said first and second friction plates;

at least one heat expansive member acting in opposition to said at least one biasing member to exert a force overcoming said at least one biasing member in response to coolant temperature rising above a predetermined value such that the first and second friction plates are forced together for rotation of the second impeller.

9. The water pump according to claim 8, wherein said at least one biasing member comprises a plurality of springs.

10. The water pump according to claim 8, wherein said heat expansive member comprises at least one fluid filled member, said fluid being expandable in response to applied heat.

11. The water pump according to claim 10, wherein said fluid comprises wax.

* * * * *